United States Patent
Ferrand et al.

(10) Patent No.: US 6,973,115 B1
(45) Date of Patent: Dec. 6, 2005

(54) PASSIVE Q-SWITCHED MICROLASER WITH CONTROLLED POLARIZATION

(75) Inventors: Bernard Ferrand, Voreppe (FR); Bernard Chambaz, Seyssins (FR); Laurent Fulbert, Voiron (FR); Jean Marty, Seyssins (FR)

(73) Assignee: Commissariat a l'Energie Atomique, (FR)

( * ) Notice: Subject to any disclaimer, the term of this patent is extended or adjusted under 35 U.S.C. 154(b) by 0 days.

(21) Appl. No.: 09/582,256

(22) PCT Filed: Dec. 23, 1998

(86) PCT No.: PCT/FR98/02848

§ 371 (c)(1),
(2), (4) Date: Jun. 22, 2000

(87) PCT Pub. No.: WO99/34486

PCT Pub. Date: Jul. 8, 1999

(30) Foreign Application Priority Data

Dec. 24, 1997 (FR) .................................. 97 16518

(51) Int. Cl.⁷ .............................................. H01S 3/08
(52) U.S. Cl. .................... 372/92; 372/98; 372/11; 372/12; 372/10
(58) Field of Search .......................... 372/10, 75, 11, 372/92, 98, 12

(56) References Cited

U.S. PATENT DOCUMENTS

| | | | |
|---|---|---|---|
| 4,786,839 A | * | 11/1988 | Hou et al. .................. 313/473 |
| 5,343,327 A | * | 8/1994 | Chai et al. .................. 359/330 |
| 5,394,413 A | * | 2/1995 | Zayhowski .................. 372/10 |
| 5,414,724 A | * | 5/1995 | Zhou et al. .................. 372/10 |
| 5,495,494 A | * | 2/1996 | Molva et al. .................. 372/98 |
| 5,502,737 A | | 3/1996 | Chartier et al. .............. 372/11 |

FOREIGN PATENT DOCUMENTS

| EP | 653824 | 5/1995 | ........... H01S 3/113 |
|---|---|---|---|
| EP | 724316 | 7/1996 | |

OTHER PUBLICATIONS

Liu et al, "Single-Frequency Q-Switched Cr=Nd:YAG Laser Operating at 946-nm Wavelength" IEEE Journal of Selected Topics in Quantum Electronics, vol. 3, No. 1, Feb. 1997, pps 26-28.

* cited by examiner

*Primary Examiner*—Don Wong
*Assistant Examiner*—Dung Nguyen
(74) *Attorney, Agent, or Firm*—Hayes Soloway P.C.

(57) ABSTRACT

This invention relates to a laser cavity with passive triggering by saturable absorbent and with controlled polarization, and to a laser and in particular to a microlaser containing the said cavity and means of pumping this cavity.

The invention also relates to a process for manufacturing the said microlaser.

The laser cavity with controlled polarization comprises a substrate made of $Y_3Al_5O_{12}$ (YAG) active laser material that may or may not be doped, on which a monocrystalline layer of saturable absorbent doped YAG material is deposited directly by liquid phase epitaxy or by a similar process, in which the said active laser material has a [100] orientation, and in which the said monocrystalline layer of saturable absorbent material is deposited with the same [100] orientation.

18 Claims, 2 Drawing Sheets

PASSIVE Q-SWITCHED MICROLASER WITH CONTROLLED POLARIZATION

BACKGROUND OF THE INVENTION

This invention relates to a laser cavity with passive triggering by saturable absorbent and with controlled polarization, and to a laser and in particular to a microlaser containing the said cavity and means of pumping this cavity.

The invention also relates to a process for manufacturing the said microlaser.

The field of the invention may very generally be defined as being the field of triggered lasers and in particular triggered microlasers pumped by diode that are developing very strongly at the moment.

One of the advantages of the microlaser is in its structure as a stack of multilayers. The active laser medium is composed of a thin material, for example between 150–1,000 $\mu$m, with small dimensions (a few mm$^2$) on which dielectric cavity mirrors are directly deposited. This active medium may be pumped by a laser diode III-V that is either hybridized directly on the microlaser or coupled to it through an optical fiber. The possibility of collective manufacture using micro-electronic means makes mass production of these microlasers possible at very low cost.

There are many applications for microlasers, in a wide variety of fields such as the automotive industry, the environment, scientific instrumentation, range finding, etc.

Known microlasers usually have a continuous emission with a power of a few tens of mW. However, most of the applications mentioned above require peak powers (instantaneous power) of a few kW output for $10^{-8}$ to $10^{-9}$ seconds, with an average power of a few tens of mW.

With solid lasers, high peak powers can be obtained by operating them in pulsed mode at frequencies varying between 10 and $10^4$ Hz. This is done using well known trigger processes, for example "Q-switch".

More precisely, triggering a laser cavity consists of adding losses that vary with time into the cavity that will prevent the laser effect for a certain time, during which the pumping energy is stored in the excited level of the gain material. These losses are suddenly reduced at precise moments, thus releasing the energy stored within a very short period ("giant pulse"). This can give a very high peak power.

In the case of an "active" trigger, the user controls the value of the losses externally (for example by a rotating intracavity acousto-optic or electro-optic cavity mirror, changing either the path of the beam or its polarization state). The storage duration, the time at which the cavity opens, and the repetition rate may be chosen independently. On the other hand, this requires appropriate electronics and complicates the laser system.

For example, an actively triggered microlaser is described in document EP-A-724 316.

In the case of "passive" triggering, variable losses are introduced into the cavity in the shape of a material (called a Saturable Absorbent (S.A.)) that is strongly absorbent (transmission Tmin) at the laser wave length, with a low power density, and which becomes practically transparent (transmission Tmax) when this density exceeds a certain threshold that is called the saturation intensity of the S.A.

The enormous advantage of passive triggering is that it requires no control electronics, and therefore the pulses may be generated without any external action.

For this type of operation called "passive triggering", the user can choose firstly the minimum transmission (Tmin) of the saturable absorbent in order to adapt it to the available pumping, and secondly the laser cavity by means of the geometry and the transmission from the output mirror.

Once these parameters have been fixed, the system has an operating point characterized by the duration of the transmitted pulses, the repetition frequency and the emitted power, and the energy per pulse.

Characteristics such as the energy and the duration of the laser pulse depend on the characteristics of the saturable absorbent and the oscillator.

On the other hand, the pulse repetition frequency is directly proportional to the power of the pump laser diode. The laser beam obtained has almost perfect characteristics; usually transverse and longitudinal single mode, Gaussian beam limited by diffraction.

Therefore the monocrystals used as the saturable absorbent (S.A.) must have very accurate characteristics obtained by a very precise control of substitutions and the material thickness.

Microlasers made at the present time such as passively triggered microlasers usually comprise a solid active medium or material that may be composed of a basic material chosen, for example, among $Y_3AL_5O_{12}$ (YAG), $LaMgAl_{11}O_9$ (LMA), $YVO_4$, $Y_2SiO_5$, $YLiF_4$ and $GdVO_4$, doped with an element such as Erbium (Er), Ytterbium (Yb), Neodymium (Nd), Thulium (Tm), Holmium (Ho) or co-doped by a mixture of several of these elements such as Er and Yb, or Tm and Ho.

Microlasers operate at different wave lengths depending on their substitution, and their emission wave length is about 1.06 $\mu$m when the active material is doped by $Nd^{3+}$, about 1.55 $\mu$m when it is doped by $Er^{3+}$, $Yb^{3+}$, and about 2 $\mu$m when it is doped by $Tm^{3+}$ and $Ho^{3+}$.

Furthermore, known saturable absorbents contain organic molecules responsible for absorption. These materials, which may be in liquid or plastic form, are often of poor optical quality, age very quickly and do not behave well under a laser flux.

Massive solid materials are also used as saturable absorbents. For example, LiF:$F_2$ crystals containing colored centers responsible for the saturable absorbent behavior of the material and which have a limited life, or some solid crystals doped with $Cr^{4+}$ with a saturable absorption about 1 $\mu$m, can be used for lasers emitting at about 1 $\mu$m and for which the active material is composed of YAG with $Nd^{3+}$ or $Yb^{3+}$ active ions.

Solid saturable absorbents have the main disadvantage of a limited concentration of absorbing ions which requires the use of large material thicknesses.

In order to overcome problems caused by solid saturable absorbents, document FR-A-2 712 743 describes a laser cavity with a solid active medium in which the saturable absorbent is in the shape of a monocrystalline thin layer.

In particular, the shape of the thin layer can minimize loses inside the laser cavity that are due to the solid shape of the conventional saturable absorbent.

Furthermore, a thin layer can be deposited on substrates with variable shapes and dimensions.

Finally, the shape of the thin layer can also be selected to save space inside the laser cavity.

In this document, the thin layer is preferably made by liquid phase epitaxy. In particular, this deposition technique can give higher concentrations of doping agents than conventional solid crystal growth processes, in other words processes such as Czochralski, Bridgman, etc.

It can also be used to more easily produce monocrystalline layers doped by different ions. Furthermore, liquid phase epitaxy (LPE) is the only conventional process capable of producing monocrystalline layers with large thicknesses, for example greater than 100 µm.

This document, and document EP-A-0 653 824, also describe deposition of the saturable absorbent thin layer by liquid phase epitaxy directly onto the active laser material acting as a substrate.

This cannot be done unless the structure of the active material is the same as the structure of the saturable absorbent material and unless liquid phase epitaxy of this material is possible.

At the present time, the only material that satisfies these conditions is $Y_3Al_5O_{12}$ (YAG) Thus, a conventional passively triggered microlaser (or chip laser) is usually composed of an active laser material made for example of YAG:Nd which is the active medium emitting light at 1.06 µm, on which a layer is epitaxied, for example composed of a variable thickness of YAG:$Cr^{4+}$ with a variable concentration of $Cr^{4+}$ depending on the derived performances.

The manufacturing process for this type of microlaser is described in patent EP-A-0 653 824 mentioned above.

After epitaxying YAG:$Cr^{4+}$ onto the YAG:Nd substrate, a polishing step is used to obtain a sheet with the required parallelism, planeness and thickness.

The laser cavity entry and exit mirrors formed by a stack of dielectric layers are then deposited on the faces of the sheet.

The sheet is finally cut into elementary microlasers. Several hundred microlasers can thus be made collectively from a single sheet.

Note that in all cases, the YAG:Nd emitting crystal has a [111] orientation, which is the normal growth axis for garnets and which can optimize laser efficiency.

Therefore, the epitaxied YAG:$CR^{4+}$ has the same orientation, with the YAG:Nd emitting crystal acting as a substrate.

Consequently, and despite all its advantages, the conventional manufacturing process for microlasers as described above cannot provide control over the polarization of the microlasers beam.

Microlasers made from crystals with a [111] orientation have a polarization direction that usually depends on residual stresses generated by epitaxy. The polarization direction is not constant over the entire surface of the substrate or sheet in which microlasers were cut.

However, there are methods for fixing the polarization of the microlaser by applying a stress on one of the side faces of the microlaser. But in this case, an assembly must be provided capable of applying a stress to each elementary microlaser, which is incompatible with a collective manufacturing process.

Furthermore in conventional devices, solid YAG:$Cr^{4+}$ crystals are used as saturable absorbents and are placed in the laser cavity as close as possible to the emitting crystal. In this case, their dimensions are of the order of a few millimeters and YAG:$Cr^{4+}$ crystals are usually oriented along the [100] crystallographic axis. The maximum saturation is obtained when the incident beam is polarized parallel to a crystallographic axis of the crystal. The laser cavities thus obtained never have a laser beam for which the polarization can be defined in advance. Therefore, there is no way of predicting what the polarization of the emitted beam will be before testing it.

Obtaining a linearly polarized beam is very important in many applications such as non-linear optics in general, and frequency doubling in particular.

In the current state of the art, it is impossible to collectively manufacture frequency doubled microlasers. The non-linear crystal used for frequency conversion must be rotated as a function of the polarization of each microlaser beam, without advance knowledge of the direction of polarization of the beam.

The non-homogeneity of the polarization of the beam on the substrate makes it impossible to assemble the substrate with a sheet of non-linear material and then to cut it to collectively manufacture frequency doubled microlasers.

Therefore, there is a need that is not satisfied at the moment for a laser cavity with a known, constant and perfectly controlled polarization direction particularly over the entire substrate of the sheet, acting as a active laser material.

Furthermore, there is a need for a laser cavity and a microlaser with a known and constant polarization direction that can be obtained by a tested collective manufacturing process without the use of other steps, and without the use of complex assemblies.

A purpose of the invention is to satisfy these needs and to supply a laser cavity and a laser such as a microlaser that do not have the disadvantages, defects and limitations of laser cavities and layers, and particularly microlasers according to the prior art, and which solve the problems of prior art.

SUMMARY OF THE INVENTION

This purpose and other purposes are achieved according to the invention by a laser cavity with controlled polarization comprising a substrate made of a doped or undoped active laser material $Y_3Al_5O_{12}$ (YAG) on which a monocrystalline layer of saturable absorbent material made of doped YAG is deposited directly by liquid phase epitaxy or by a similar process, in which, the said active laser material has a [100] orientation, and the said monocrystalline layer of saturable absorbent material is deposited with the same [100] orientation.

BRIEF DESCRIPTION OF THE DRAWINGS

The foregoing and other objects, features and advantages of the invention will be apparent from the following more detailed description taken in conjunction with the accompanying drawings in which like numerals pick like parts, and wherein.

DETAILED DESCRIPTION OF PREFERRED EMBODIMENTS

Figure 1:
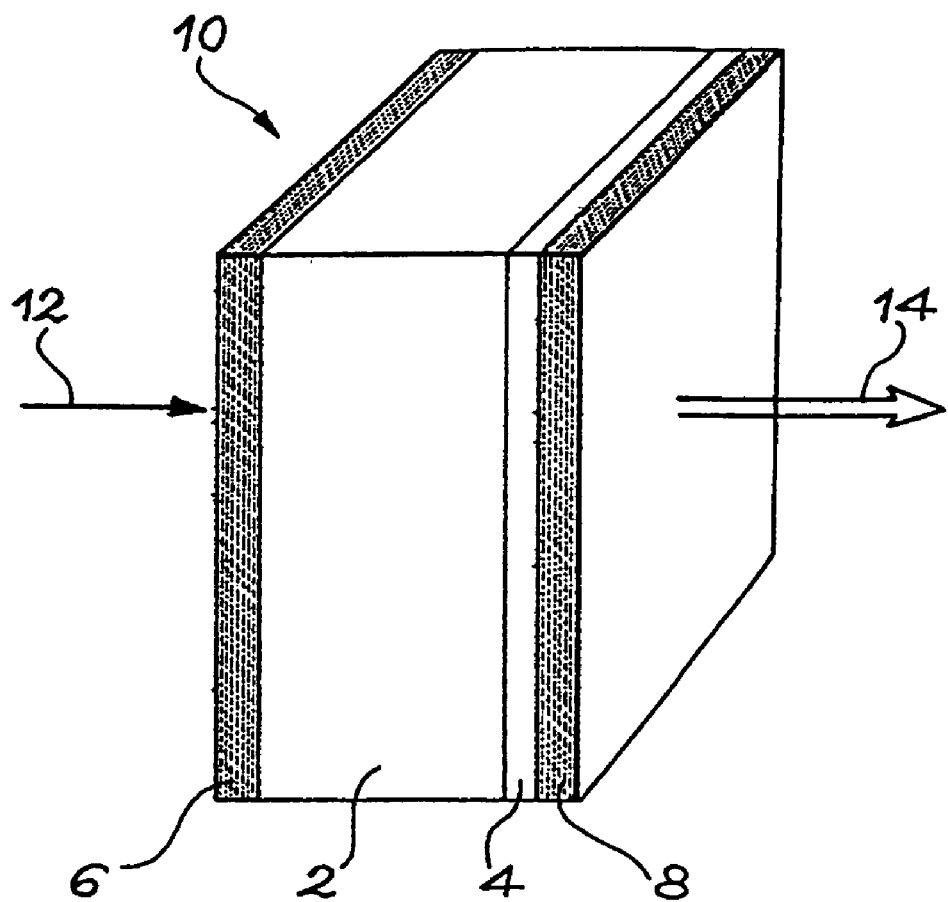
FIG. 1 is a perspective view of a microlaser or microlaser cavity embodying the present invention.

According to the invention, the said monocrystalline layer of saturable absorbent material made of doped YAG is obtained by liquid phase epitaxy (LPE) or by a similar process, in other words by a process capable of producing a layer with the same characteristics as a layer obtained by LPE, for example this type of process may consist of a vapor phase deposition process or a laser ablation deposition process.

In other words, this relates to a layer that can be obtained by liquid phase epitaxy.

However, the monocrystalline layer of saturable absorbent material is preferably obtained by liquid phase epitaxy.

The laser cavity according to the invention in which the substrate made of the active laser material has a [100] orientation, is fundamentally different from cavities according to prior art in which substrates made of a YAG active laser material have a [111] orientation.

In the particular case of microlaser wafers made from substrates with a [111] orientation, it is clear that the polarization direction is never constant on these wafers regardless of the pumping type.

On the other hand, the beam may be polarized along two preferred perpendicular directions on wafers comprising a substrate made of a YAG active laser material with a [100] orientation according to the invention. On this type of wafer according to the invention, the polarization direction of the laser beam is constant regardless of the nature of the pumping source.

Thus if pumping is done with an unpolarized source, the polarization direction of the emitted laser beam is constant, whereas if pumping is done with a polarized source, the polarization direction of the emitted laser beam is also constant and is along one of the two preferred directions.

The choice of one of these directions depends on the polarization direction of the pump beam.

In all cases, due to its particular orientation [100], the laser cavity according to the invention has a constant polarization direction known in advance for given pumping conditions.

According to the invention, the beam from the laser such as a microlaser is obtained directly polarized without any other assembly operation being necessary, due solely to the specific [100] orientation.

Consequently, laser cavities according to the invention may easily be made by a known and well tested collective manufacturing process.

According to the invention, the substrate is a substrate made of a doped or undoped $Y_3Al_5O_{12}$ (YAG) active laser material that has a [100] orientation.

Therefore, the substrate and the monocrystalline layer of saturable absorbent, also with a [100] orientation, have the same crystallographic structure, but it is often necessary to adjust mesh parameters of the substrate and/or the monocrystalline layer. This adjustment is usually made using appropriate doping agents described below as part of the detailed description of the monocrystalline layer, the said doping agents possibly being added in the epitaxy bath in the form of oxide(s).

In other words, as already mentioned above, the substrate and the layer have the same crystallographic structure and are only differentiated by their different doping agents that for example affect the crystalline and/or optical properties of the layer and/or substrate, and preferably of the layer.

According to the invention, the substrate is a YAG active laser material, in other words it may or may not be doped by one or several ion(s) that confer active laser material properties on it, and for example chosen among the Nd, Cr, Er, Yb, Ho, Tm, and Ce ions.

Note now that most ions used to confer active laser material properties on the YAG may also be used to make the YAG amplifying.

Thus, the YAG may be doped with Nd (Neodymium) or Yb (Ytterbium) active ions for an emission at about 1.06 $\mu$m, or with Er (Erbium) active ions for an emission at about 1.5 $\mu$m, with Ho (Holmium) or Tm (Thulium) active ions for an emission of 2 $\mu$m, and the YAG may also be co-doped by Er and Yb (Erbium-Ytterbium) ions for an emission at 1.5 $\mu$m, by Tm and Ho (Thulium and Holmium) ions for emission at 2 $\mu$m, or by Er, Yb and Ce (Erbium, Ytterbium and Cerium) ions for emission at 1.5 $\mu$m.

Preferably, the YAG is doped with neodymium; this material is the best known and most frequently used solid laser material at the present time.

The proportion of the doping ion(s) is usually 0.1 to 10% (in moles) for each ion.

According to a fundamental characteristic of the invention, the substrate made of an active laser material also has a specific [100] orientation. This orientation can be obtained either by orienting a crystal drawn with a traditional [111] orientation or by drawing a crystal with a [100] orientation directly, which is possible provided that some adaptations are made to growth conditions.

As described below, the size and shape of the substrate are variable. One of the advantages of the liquid phase epitaxy technique is precisely that it is capable of producing excellent quality layers regardless of the shape (even complex) and size of the substrate.

The substrate may be composed either of a conventional laser bar, or advantageously according to the invention of a microlaser substrate that is composed of a monocrystalline sheet with a thickness for example between 500 $\mu$m and 2 mm and preferably between 0.1 mm and 2 mm. Preferably, this sheet is polished on its two parallel faces.

The monocrystalline layer of YAG saturable absorbent material according to the invention has a special structure such that it is still feasible to make a compact device that can be collectively manufactured at low cost.

This structure does not degrade the material properties, but can on the contrary improve them by the use of guided wave phenomena in some cases.

The monocrystalline layers of saturable absorbent material according to the invention also have all the advantages inherent to the liquid phase epitaxy (LPE) growth process by which they are obtained or could be obtained. These advantages are described in more detail in the document describing prior art mentioned above.

In particular, with this LPE process it is possible to obtain uniform doping, for example with chromium, rare earths, transition metals or gallium.

This homogeneity parameter is an essential parameter when it is required to optimize the optical performances of a device.

In the liquid phase epitaxy technique according to the invention, the layers are produced at constant temperature within the range defined below and consequently have good in-depth homogeneity of its composition.

The only possible disturbances are at the interface and the surface of the layer, but this defect can be corrected by gently polishing the surface.

Furthermore, epitaxy is a means of achieving much higher doping agent concentrations than conventional processes for the growth of solid crystals, so that very thin layers can be used with all the resulting advantages.

Furthermore, liquid phase epitaxy offers the possibility of co-doping with different ions; it is often necessary to use several substitutions in order to optimize the properties of the epitaxied layer, such as the mesh parameter, the refraction index, absorption, etc.

The liquid phase epitaxy technique can be used to prepare layers with complex compositions and several cations.

The liquid phase epitaxy technique facilitates control over the thickness of the deposited layer, usually between 1 and 500 $\mu$m, and preferably between 1 and 200 $\mu$m, and even better between 20 and 150 $\mu$m, and even better still between 50 and 100 $\mu$m.

We refer to "thin layers" for thicknesses usually between 1 and 150 $\mu$m, and preferably between 1 and 100 $\mu$m.

Since the growth rate is usually of the order of 1 μm/min., 100 μm thick layers can be prepared fairly quickly, within a few hours.

A monocrystalline layer of a saturable absorbent material made of doped YAG means a YAG with at least one substitution by an ion that confers saturable absorbent properties on it.

Thus, YAG can be doped by one or several doping ions chosen among Chromium (Cr), Erbium (Er), Thulium (Tm), and Holmium (HO) ions.

Preferably, the said doping ion is Chromium $Cr^{4+}$.

The proportion of the doping agent(s) that confer(s) saturable absorbent properties on the YAG is usually a few % (in moles), for example 1 to 10% for each doping agent.

Furthermore, the YAG is usually firstly substituted by $Mg^{2+}$ ions such that substitution with active ions such as $Cr^{4+}$ can take place without charge compensation.

In other words, in this case the YAG actually contains the same number of moles of Mg as moles of doping agent, in particular $Cr^{4+}$.

In the same way as for the thickness, the doping rate and the nature of the doping agent in the saturable absorbent layer, are adapted to the laser that is to be triggered so that the monocrystalline saturable absorbent layer has a saturable absorption appropriate to the laser emission wave length.

For example, $Cr^{4+}$ will be chosen for a laser emitting at 1.06 μm, $Er^{3+}$ will be chosen for a laser emitting at 1.5 μm, or Thulium (Tm) or Holmium (Ho) will be chosen for a laser emitting at 2 μm.

Consequently, an active ion in the saturable absorbent layer will preferably correspond to an active laser ion in the active laser material.

Nd—Cr, Er—Er, Tm—Ho and Yb—Cr are suitable laser active ion-saturable absorbent ion pairs.

According to the invention, the Nd—Cr pair is particularly preferred.

The monocrystalline layer of saturable absorbent material with a [100] orientation, or the substrate, preferably the layer, may also comprise at least one (other) doping agent or substitute in order to modify any one of their properties, for example structural and/or optical properties such as the absorption, refraction index and/or mesh parameter.

For example, these doping agents are chosen from among gallium and inactive rare earths such as lutetium, gadolinium, yttrium; inactive rare earths usually refer to rare earths that do not confer properties such as laser emitting properties, amplifier or SA properties to the YAG.

Thus, it would also be possible to co-dope layers with Gallium (Ga) and/or an inactive rare earth such as yttrium (Y), and/or lutetium (Lu) and/or gadolinium.

A preferred additional co-doping is Gallium-Lutetium co-doping in which the gallium is used to adapt the index, the gallium also widening the crystalline network mesh, this widening being compensated by Lutetium.

Conventionally, the laser cavity also comprises an entry mirror and an exit mirror. These mirrors are preferably dichroic mirrors.

A microlaser or a microlaser cavity 10 is shown in FIG. 1 and comprises an active solid material 2, and a saturable absorbent material 4. These two materials are included between two mirrors 6 and 8 which close the laser cavity. Reference numerals 12 and 14 identify a pumping beam of the laser microcavity and an emitted beam, respectively.

The entry mirror is deposited directly on the active laser material substrate and the exit mirror is directly deposited on the monocrystalline layer of saturable absorbent material.

The laser cavity according to the invention may be in several shapes, each corresponding to the possible shape of the substrate made of a active laser material; further information on this subject is given in document FR-A-2 712 743.

Thus, there may be a laser bar in the substrate; but preferably, the substrate according to the invention is a microlaser substrate composed of a monocrystalline sheet, preferably a sheet with parallel faces polished on its two faces.

The invention also relates to a process for the collective manufacturing of triggered microlaser cavities with controlled polarization.

This process is almost identical to the known conventional process for manufacturing microlasers, but it is fundamentally different due to the specific [100] orientation of the substrate made of an active laser material and the monocrystalline layer of saturable absorbent material.

Figure 2:
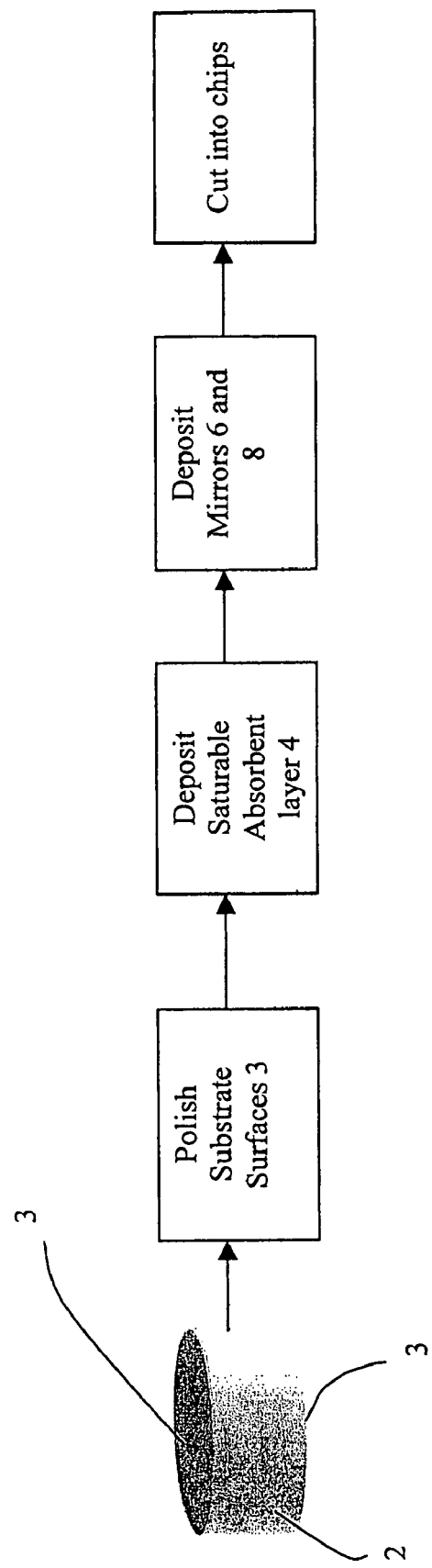
FIG. 2 schematically illustrates the process for manufacturing a microlaser in accordance with the present invention.

Therefore, this process also comprises the following steps. Referring to FIG. 2:

a substrate 2 made of a doped or undoped $Y_3Al_5O_{12}$ (YAG) laser material with a [100] orientation is supplied in the shape of a sheet with parallel faces polished on its two faces 3;

a monocrystalline layer of doped YAG saturable absorbent material is deposited on one of the faces 3 of the said $Y_3Al_5O_{12}$ (YAG) active laser material, by liquid phase epitaxy or by a similar process;

the saturable absorbent monocrystalline layer thus deposited is polished;

the entry 6 and exit 8 mirrors are deposited on the two polished faces of the cavity (preferably the entry mirror 6 is deposited in the active layer material); and the substrate-monocrystalline layer-mirrors complex thus obtained is cut out.

This thus gives a large number of triggered microlaser cavities (or microlasers), all these microlasers having known and identical polarization characteristics, which very significantly reduces their cost.

Finally, the invention relates to a laser, preferably a microlaser, triggered with a controlled polarization comprising a cavity like the cavity described above, preferably a microlaser cavity, and pumping means for this cavity.

Preferably, these pumping means comprise at least one lamp or diode that pumps the cavity along a transverse or longitudinal direction.

The process according to the invention, also due to the specific [1, 0, 0] orientation of the substrate and the monocrystalline layer, can be used to collectively manufacture microlasers with a known polarization direction, which was never possible in prior art. The microlaser beam is obtained directly polarized without any other operation or assembly, which is compatible with a collective manufacturing process.

Furthermore, the resulting microlaser performances are not degraded in any way compared with microlasers prepared with SA substrates and layers with conventional [111] orientations. This maintenance of performances despite the unexpected choice of a different orientation is one of the unexpected effects and advantages of the invention.

Since the performances are not degraded, the microlaser according to the invention can be used in many applications such as frequency doubling. There is no need to individually test each microlaser or to use an external means to determine the polarization direction, since all microlasers have known and identical polarization characteristics.

Apart from the particular collective manufacture of pulsed green microlasers, the invention has general applications in all fields of non-linear optics and in all cases in which a linearly polarized pulsed beam is necessary, for example such as frequency doubling, frequency conversion such as tripling, quadrupling, etc., and optical parametric oscillation (OPO).

The advantages and characteristics of the invention will become clearer after reading the following description which is given for illustrative and non-limitative purposes.

Thus more precisely, first of all the process according to the invention consists of a first step in choosing and preparing the substrate.

As mentioned above, the substrate may be any substrate on which a layer can be deposited, for example a thin layer of YAG using the liquid phase epitaxy technique, subject to the essential condition according to the invention that the material in the said substrate is orientated along the [100] direction.

Most of these substrates have already been described above.

The laser type to be made controls the doping ion(s) in the deposited YAG layer, and the type of YAG used for the substrate.

The operating mode of this laser determines whether or not the substrate should be composed of an active laser material, and its shape and dimensions.

The dimension and shape of the substrate are variable, one of the advantages of the liquid phase epitaxy technique is precisely that it can be used to make excellent quality layers, regardless of the shape (even complex) and size of the substrate.

For example, the substrate can be made from a doped or undoped YAG ingot with a diameter for example equal to 1 or 2 inches, in other words about 25 to 50 mm, with a [100] orientation.

This type of orientation in the substrate can be achieved either by orienting a crystal drawn along the traditional [111] orientation, or by drawing a crystal along the [100] orientation directly, which is only possible if some adaptations are made to growth conditions, namely reduction of the drawing speeds, increase of the cooling time.

Regardless of what method is used to manufacture the crystals with the [100] orientation, they can all be easily obtained on the market.

Substrates are cut from this ingot, for example in the shape of sheets with parallel sides using an appropriate cutting instrument, for example using a diamond saw. These substrates in the shape of sheets may have a variable thickness, for example from 500 µm to 2 mm.

At least one of the faces of the substrate is then ground and polished. The purpose of grinding is:
  firstly, to remove the surface layer that was work hardened by cutting;
  secondly, possibly to change the thickness of the sheets so that they are equal to the required thickness, for example in the case of a laser application this thickness will be slightly greater than the microlaser specification and usually between 100 and 1000 µm.

The thickness of the active medium is a parameter that controls some characteristics of the microlaser, such as particularly the spectrum width and the number of longitudinal modes.

Substrates, for example ground sheets possibly close to the required thickness, are then polished to an optical quality.

Polishing is done on at least one face of the substrate, but the substrate may have two parallel faces with the same polishing quality for some functional requirements, for example for a wave guide laser.

Thus, substrates may have one polished face or two polished faces.

Polishing is done using a mechanochemical process so that the polished faces(s) is(are) free of all defects (inclusion, dislocation, stress, scratch, etc.) that would propagate through the thickness of the layer during epitaxy. This polishing quality is controlled by appropriate chemical etching. The process developed for substrates used in conventional epitaxy techniques.

After the first step in which the substrate is chosen and prepared, the next step is to prepare the epitaxy bath that is a supersaturated solution composed of a solvent and a solute.

According to the invention, the first step is to prepare the epitaxy bath, carefully weighing a mixture of PbO and $B_2O_3$ oxides (the mixture of these two oxides forms the solvent), and a mixture of $Y_2O_3$ and $Al_2O_3$ that forms the solute.

The different doping agent(s) is (are) then possibly added in the form of oxides, for example $Cr_2O$ and MgO, consequently it is sometimes necessary to add one or several other oxides such as oxides of the elements mentioned above, in order to compensate charges.

For example, the concentration in moles % of the different oxides in the epitaxy bath for preparation of the undoped YAG is 0.5 to 0.7 moles % of $Y_2O_3$, 1.5 to 2.5 moles % of $Al_2O_3$, 80 to 90 moles % of PbO, and 5 to 10 moles % of $B_2O_3$.

The oxide(s) in the doping agent(s), when present, is (are) in the proportions mentioned above for each agent, in other words for example 0.5 to 2.0 moles % of $CrO_2$, and 0.5 to 2.0 moles % of MgO.

A typical mixture (as an example) may be composed of 14 g of $Y_2O_3$, 15 g of $Al_2O_3$, 6 g of MgO, 23 g of $CrO_2$, 1700 g of PbO and 45 g of $B_2O_3$.

The solute and solvent mixture is then melted in an appropriate device, for example in a platinum crucible and for example at a temperature of between 900 and 1100° C. (for example about 1000° C.) to form the epitaxy bath itself. The device, such as a crucible, is then placed in a conventional device in order to achieve crystalline growth by liquid phase epitaxy.

For example, this device may be an epitaxy oven which in particular is an oven with two heating areas and with a controlled temperature gradient.

Preferably, the substrate is driven by a uniform rotation or translation movement, or an alternating movement such that a uniform thickness can be deposited.

Similarly, the epitaxy bath may be mechanically stirred using an appropriate device such as a platinum stirrer.

A spindle supporting the stirrer, or the substrate support-substrate assembly can be used to transfer the required movements to one or to the other.

The third step in the process is the epitaxy step itself.

According to the invention, the liquid phase epitaxy operation is performed at a constant temperature within the 1000° C. to 1100° C. range, which can give a uniform concentration of doping agent within the thickness of the YAG layer.

For example, the first step is to mechanically stir the liquid mixture at a temperature slightly greater than the epitaxial growth temperature, for example at about 1150° C.

using the mechanical stirring device described above, such as a platinum stirrer. The oven temperature is then lowered to the quenching temperature which is preferably between 1000° C. and 1100° C.

The substrate, for example in the horizontal position, is then put into contact with the epitaxy bath, substrates with polished faces being dipped at the surface of the bath, whereas substrates with two polished faces are immersed in this bath.

The contact duration depends on the required thickness, this thickness possibly varying within the ranges mentioned above, in other words from 1 to 500 μm, for example 100 μm. The growth rates are usually of the order of 0.5 (???) to 1 μm/min. (???).

According to the invention, and in order to take account of the difference in behavior between substrates with a [111] orientation according to prior art and substrates with a [100] orientation according to the invention, the growth conditions have to be modified since the [100] orientation firstly causes an increase in the growth rate and secondly increases the brittleness of the crystals, the quenching duration or the contact duration is slightly reduced in the process according to the invention and will therefore usually be about ¼ less than the time necessary for substrates with a [111] orientation.

Furthermore and also to take account of the difference in behavior between substrates with [111] and [100] orientations, the cooling phases are checked particularly to minimize thermal shocks; the substrate is lifted out of the oven gradually at a rate of 10 mm per minute instead of 50 mm per minute.

At the exit from the epitaxy bath, the substrate and the epitaxy layer (for a substrate with one face) or layers (for a substrate with two faces with an epitaxied layer on each face) are subjected to an operation designed to eliminate the solvent. For example, the coated substrate is subjected to an accelerated rotation movement to eject the remaining solvent.

The epitaxy step is terminated by chemical cleaning, for example using an acid such as $HNO_3$.

The next steps are conventional steps similar to the steps used to make microlasers with a [1,1,1] orientation.

The saturable absorbent layer is polished particularly to adjust its absorption properties. This polishing is usually done by chemical etching, for example in phosphoric acid or by mechanochemical polishing.

The entry and exit mirrors for the laser cavity are then deposited directly and the assembly formed by the substrate in the shape of the sheet, the monocrystalline layer of saturable absorbent material and the mirrors, are cut into a large number of microlaser cavities, for example parallelepiped-shaped and usually 1 mm×1 mm, therefore each forming a triggered microlaser cavity with perfectly controlled polarization.

It has been observed that the performances of microlasers obtained such as the energy of the laser pulse, and its duration and its repetition frequency, are not degraded.

What is claimed is:

1. A laser cavity formed between an entry mirror and an exit mirror, and comprising:
a substrate made of a doped or undoped active laser material $Y_3Al_5O_{12}$ (YAG) on which a monocrystalline layer of saturable absorbent material made of doped YAG is deposited directly by liquid phase epitaxy, in which both said active laser material and said monocrystalline layer of saturable absorbent material have the same [100] orientation;
wherein said doped or undoped active laser material YAG, said monocrystalline layer of saturable absorbent material made of doped YAG deposited directly on said active laser material by liquid phase epitaxy, and the same specific orientation of both said active laser material [100] and said monocrystalline layer [100] achieves controlled polarization of the laser cavity.

2. A laser cavity according to claim 1, in which said monocrystalline layer of doped saturable absorbent material is deposited by liquid phase epitaxy (LPE).

3. A laser cavity according to claim 1, in which the substrate is a YAG active laser material, doped by one or several doping ion(s) that confer active laser material properties on it.

4. A laser cavity according to claim 3, in which at least one said doping ion is selected from the group consisting of: Nd ion, Cr ion, Er ion, Yb ion, Ho ion, Tm ion and Ce ion.

5. A laser cavity according to claim 3, in which the proportion of the doping ion(s) is 0.1 to 10 moles % for each ion.

6. A laser cavity according to claim 1, in which the monocrystalline layer of a saturable absorbent material is a YAG doped with one or several doping ions selected from the group consisting of Chromium (Cr) ion, Erbium (Er) ion, Thulium (Tm) ion, and Holmium (Ho) ion.

7. A laser cavity according to claim 6, in which said doping ion is Chromium ion.

8. A laser cavity according to claim 6, in which the proportion of the doping ion(s) is 1 to 10 moles % for each doping ion.

9. A laser cavity according to claim 1, in which the layer and/or the substrate are doped with at least a second doping agent or substitute in order to modify their structural and/or optical properties.

10. A laser cavity according to claim 9, in which said second doping ion is selected from the group consisting of gallium ion and an inactive rare earth ion.

11. A laser cavity according to claim 1, in which the thickness of the monocrystalline layer of saturable absorbent material is between 1 and 500 μm.

12. A laser cavity according to claim 1, in which the said monocrystalline layer of saturable absorbent material is a thin layer with a thickness of between 1 and 150 μm.

13. A laser cavity according to claim 1, which also comprises an entry mirror and an exit mirror, said entry mirror being directly deposited on the substrate made of a saturable absorbent material.

14. A laser cavity according to claim 13, in which the exit mirror is directly deposited on the monocrystalline layer made of a saturable absorbent material.

15. A process for the collective production of triggered microlaser cavities comprising the steps of:
supplying a substrate made of a doped or undoped $Y_3Al_5O_{12}$ (YAG) active laser material with a [100] orientation in the shape of a sheet with parallel faces polished on its two faces;
depositing a monocrystalline layer of doped YAG saturable absorbent material on one of the faces of the said $Y_3Al_5O_{12}$ (YAG) active laser material, by liquid phase epitaxy;
polishing the saturable absorbent monocrystalline layer thus deposited;
depositing entry and exit mirrors on the two polished faces of the cavity; and cutting out the substrate-monocrystalline layer-mirrors complex thus obtained;

wherein said doped or undoped active laser material YAG, said monocrystalline layer of saturable absorbent material made of doped YAG deposited directly on said active laser material by liquid phase epitaxy, and the specific orientation of both said active laser material [100] and the said monocrystalline layer [100] achieves controlled polarization of the laser cavity.

16. A triggered laser with controlled polarization comprising a cavity according to claim 1, and pumping means for this cavity.

17. A laser cavity according to claim 1, in which the entry mirror is deposited directly on the active laser material substrate.

18. A process according to claim 15, wherein the entry mirror is deposited on the active laser material.

* * * * *